(12) United States Patent
Coombes (10) Patent No.: US 6,978,147 B2
(45) Date of Patent: Dec. 20, 2005

(54) WIRELESS MESSAGING DEVICE WITH SELECTABLE SCROLL DISPLAY AND MESSAGE PRE-FETCH

(75) Inventor: Daniel Coombes, Glen Ellyn, IL (US)

(73) Assignee: Motorola, Inc., Schaumburg, IL (US)

(*) Notice: Subject to any disclaimer, the term of this patent is extended or adjusted under 35 U.S.C. 154(b) by 249 days.

(21) Appl. No.: 10/391,920

(22) Filed: Mar. 19, 2003

(65) Prior Publication Data

US 2004/0203959 A1  Oct. 14, 2004

(51) Int. Cl.[7] .............................................. H04Q 7/20
(52) U.S. Cl. .................. 455/466; 455/412.2; 455/413; 455/414.2; 455/414.3; 455/414.4; 455/414.1; 702/203; 715/513
(58) Field of Search .............................. 455/412.2, 413, 455/414.2, 414.3, 414.4, 414.1, 466; 202/203; 215/513

(56) References Cited

U.S. PATENT DOCUMENTS

| | | | |
|---|---|---|---|
| 6,016,424 A * | 1/2000 | Hicks et al. | 455/414.1 |
| 6,189,019 B1 * | 2/2001 | Blumer et al. | 715/513 |
| 2002/0129096 A1 * | 9/2002 | Mansour et al. | 709/203 |
| 2004/0224706 A1 * | 11/2004 | Lorello et al. | 455/466 |

* cited by examiner

*Primary Examiner*—Joseph Feild
*Assistant Examiner*—David Q Nguyen
(74) *Attorney, Agent, or Firm*—Scott M. Garrett (57) ABSTRACT

A system, method and computer readable medium for scroll displaying of message information stored in message memory (418) of a wireless messaging device (400). The wireless messaging device (400) fetches additional message information from a wireless messaging server (112) over a wireless network, and stores in message memory (418) the additional message information received over the wireless network prior to reaching the end of scroll displaying the stored message information. Additionally, a plurality of received messages can be scroll displayed according to a message receive order or other priority.

18 Claims, 3 Drawing Sheets

WIRELESS MESSAGING DEVICE WITH SELECTABLE SCROLL DISPLAY AND MESSAGE PRE-FETCH

FIELD OF THE INVENTION

The present invention generally relates to the field of wireless messaging systems, and more particularly relates to wireless messaging devices with scrolling display of received messages.

BACKGROUND OF THE INVENTION

With the extremely successful commercial acceptance of wireless messaging communication devices, such as modern pagers, wireless communicators, cellular phones, and mobile telephones, wireless messaging is fast becoming a common form of communication. Packet data radio services on cellular systems, for example, has enabled greater connectivity to corporate services such as email, web browsing, and file transfers, where a significant amount of message data is available to be delivered to a portable wireless messaging communication device. Having the capability to remotely read email enhances worker productivity for people on the move away from the desks.

Due to user preferences for smaller devices, portable wireless messaging communication devices continue to reduce in size. Users prefer smaller devices so as to enhance the portability of the devices on a person. The smaller size of contemporary devices normally leads to a small display screen size.

A significant problem encountered when using a wireless messaging communication device with a small display screen is that reading messages, especially the larger messages received such as via email messaging and web downloads, tends to cause a user of the device to constantly interact with a user input interface such as via buttons, keys, joysticks, navigation wheels, and other input devices, to read an email message or other lengthy message via the display.

For example, in conventional cellular phone systems, reading an email message requires a user to constantly activate a scroll down button to read a message via the display. The scroll down message capability is very limited so the user must activate a request for more message download to the device to cause the device to fetch an additional portion of the lengthy message from the wireless communication system server to be able to continue reading the remainder of the message via the display. This fetch request requires the user to activate more buttons and then the user has to wait for the additional message to be downloaded over the air from the wireless communication system server. Regrettably, reading the entire lengthy message entails numerous activations of buttons on the cellular phone device plus extensive waiting times for additional message data to be downloaded to the cellular phone device.

Contemporary wireless messaging devices have attempted to reduce the amount of button activations and related frustration to a user, by significantly increasing the size of a display screen, such as the larger screens on PDA-like devices, to view a larger message on the display screen. Additionally, large amounts of message memory are used to download the entire message into the device to avoid the wait times. Both of these solutions have greatly added cost and size to wireless messaging devices, such as cellular phones, which is contrary to the consumer demands thereby reducing the commercial viability of these solutions in the marketplace.

Therefore a need exists to overcome the problems with the prior art as discussed above.

SUMMARY OF THE INVENTION

Briefly, in accordance with a preferred embodiment of the present invention, a method comprises: wirelessly receiving message information; storing the received message information; scroll displaying the stored message information; and wirelessly requesting fetch of additional message information such that the additional message information will be wirelessly received prior to reaching the end of scroll displaying the stored message information.

In another embodiment of the present invention, a wireless messaging device comprises: a receiver for receiving message information wirelessly transmitted from a wireless communication system; a transmitter for wirelessly transmitting information to the wireless communication system; a display for progressively displaying message information to a user; a memory for storing message information; a device controller, communicatively coupled to the receiver, the transmitter, the display, and the memory, for receiving message information, storing the received message information in the memory, and progressively displaying the stored message information to the user; and a message information fetch controller, communicatively coupled to the device controller, for automatically determining that additional message information is needed to be stored in the memory to continue to progressively displaying message information to the user, and for transmitting a request to the wireless communication system for requesting additional message information be wirelessly transmitted from the wireless communication system to the wireless messaging device to continue to progressively display message information to the user.

DETAILED DESCRIPTION

The present invention, according to a preferred embodiment, advantageously overcomes problems with the prior art by providing a system, method and computer program product for combining an auto-scrolling message display with a message pre-fetch function to enhance the user's display reading experience without having to give up the smaller form factor of modern wireless messaging devices, e.g., today's typical cellular phone, as will be discussed in detail below.

Figure 1:
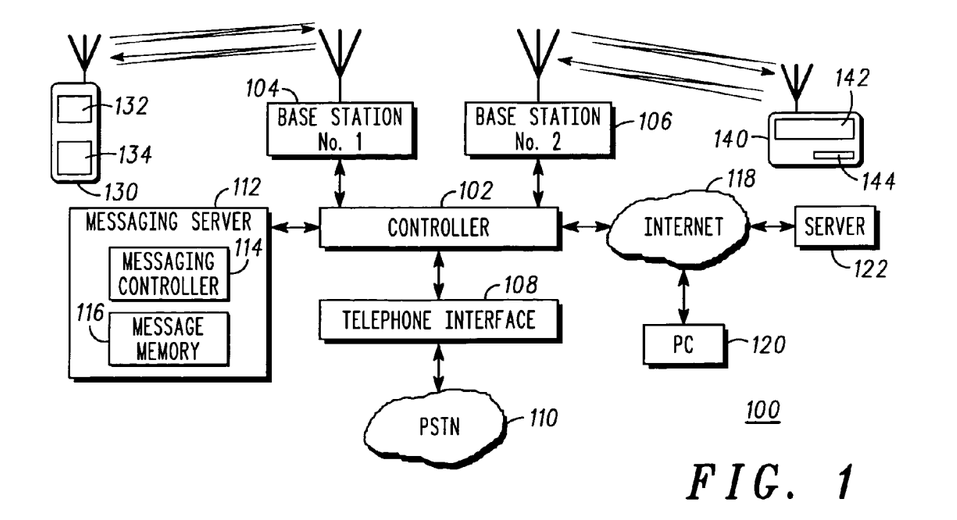
FIG. 1 is a block diagram illustrating a wireless communication system in accordance with a preferred embodiment of the present invention.

FIG. 1 is a block diagram illustrating an exemplary wireless communication system 100 in accordance with a preferred embodiment of the present invention. FIG. 1 shows a wireless communication system controller 102 operating on a wireless network comprising wireless transceiving basestations 104, 106. The wireless communication system controller 102 is communicatively coupled with the wireless transceiving basestations 104, 106, via wired and/or wireless communication links. The wireless communication system controller 102 communicates, via the wireless transceiving basestations 104, 106, with mobile wireless messaging communication devices 130, 140, that are mobile in the wireless network. The base stations 104, 106, individually support portions of a geographic coverage area containing subscriber units or transceivers (i.e., wireless messaging communication devices) 130, 140. The wireless devices 130, 140 interface with the basestations 104, 106, using a communication protocol such as Code Division Multiple Access (CDMA), Time Division Multiple Access (TDMA), Global System for Mobile Communications (GSM), General Packet Radio Service (GPRS), Frequency Division Multiple Access (FDMA), Universal Mobile Telecommunications System (UMTS), and two-way paging and wireless messaging protocols. The wireless communication system controller 102 is communicatively coupled to an external telephone network (such as the Public Switched Telephone Network) 110 through a telephone interface 108.

The geographic coverage area of the exemplary wireless communication system 100 is divided into coverage regions or cells, which are individually serviced by the basestations 104, 106, (also referred to as cell servers). A wireless device operating within the wireless communication system 100 selects a particular cell server as its primary interface for receive and transmit communications within the system 100. For example, wireless messaging device 130 has cell server 104 as its primary cell server, and wireless messaging device 140 has cell server 106 as its primary cell server. Preferably, a wireless messaging device selects a cell server that provides the best communication interface into the wireless communication system 100. Ordinarily, this will depend on the signal quality of communication signals between a wireless device and a particular cell server.

As a wireless messaging device moves between various geographic locations in the coverage area, a hand-off or hand-over may be necessary to another cell server, which will then function as the primary cell server. A wireless device monitors communication signals from basestations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal. In this way, each of the wireless messaging communication devices 130, 140, can travel from cell to cell while maintaining effective and reliable wireless messaging communication with the wireless system controller 102.

The wireless communication system controller 102, in the current example, operates as a third-generation Internet-capable mobile phone and wireless messaging service. However, it is understood by those of ordinary skill in the art that the wireless communication system controller 102, according to alternative embodiments, can operate as a first-generation analog mobile phone and wireless text messaging service, as a second-generation digital mobile phone service, as a third-generation Internet-capable mobile phone service, as a two-way paging service, and as other well known wireless messaging services, and the like.

The wireless communication system 100, according to the present example, comprises a mobile phone network, a mobile text messaging network, and a two-way paging and messaging network. Further, the communications protocols supported in the wireless network of FIG. 1 comprise Code Division Multiple Access (CDMA), Time Division Multiple Access (TDMA), Global System for Mobile Communications (GSM), General Packet Radio Service (GPRS), Frequency Division Multiple Access (FDMA), two-way paging and wireless messaging protocols, and the like.

The wireless network supports any number of wireless messaging communication devices 130, 140, that are mobile in the wireless network, such as mobile telephones, smart phones, wireless messaging devices, two-way pagers, handheld computers equipped with wireless transceivers, PDAs with wireless messaging capability, and the like. A smart phone, according to the present example, is a combination of 1) a pocket PC, a handheld PC, a palm top PC, or a Personal Digital Assistant (PDA) and 2) a mobile telephone. The exemplary wireless messaging communication devices 130, 140, will described in further detail below. However, according to the present example, the wireless messaging communication device 130, shown communicating with the first basestation 104, comprises a smart phone with a display screen 132 and a message memory 134 for storing message information that can be displayed via the display screen 132. The smart phone 130 encompasses the conventional functions of a cellular telephone, including initiating and receiving telephone calls, voice mail, contact information storage, call data storage and initiating and receiving text communications. A smart phone typically comprises a combination of 1) a pocket PC, handheld PC, palm top PC, or PDA, and 2) a mobile telephone. According to an alternative embodiment, the wireless messaging communication device 130 encompasses the conventional functions of an Integrated Digital Enhanced Network (iDEN) cellular telephone commercially available from Motorola, Inc., of Schaumburg, Ill., U.S.A. An iDEN cellular telephone integrates two-way radio, telephone, text messaging, and data transmission into a single wireless network.

Further, the wireless messaging communication device 140, shown communicating with the second basestation 106, comprises a two-way wireless messaging device, such as a two-way paging and wireless messaging device 140. The two-way paging and wireless messaging 140 includes a display screen 142 and a message memory 144 for storing message information that can be displayed via the display screen 142.

The wireless communication system controller 102 is communicatively coupled to a messaging server 112 for handling wireless messaging communication with the exemplary wireless messaging communication devices 130, 140, in the wireless network. The messaging server 112 comprises a messaging controller 114 and messaging memory 116 for storing message information destined for reception by at least one of the wireless messaging communication devices 130, 140, and then sending the message information to the at least one of the wireless messaging communication devices 130, 140, according to a message communication protocol. Each of the at least one of the wireless messaging communication devices 130, 140, typically sends a message fetch request to the messaging server 112 via the wireless network. The message fetch request requests a next portion of a message to be sent to the particular one of the wireless messaging communication devices 130, 140. The messaging controller 114, in response to the request, retrieves the requested message information from the messaging memory 116 and couples the message information via the controller 102 and the wireless network to the particular one of the wireless messaging communication devices 130, 140.

The messaging server 112, for example, may comprise an email server that receives email message information via SMTP protocol and stores the received message information in the messaging memory 116 until it is time to forward the email message information to the particular recipient at least one of the wireless messaging communication devices 130, 140. The email messages may originate from devices that dial-up via the Public Switch Telephone Network (PSTN) 110 and then couple the email message information via a telephone interface 108 to the controller 102 and thereby to the messaging server 112. Alternatively the email message information may originate from a personal computer device 120 that couples the email message information via the Internet 118, or other such wide area network, and to the controller 102 and thereby to the messaging server 112. The messaging server 112 then forwards the email message information to the particular destination one of the wireless messaging communication devices 130, 140. This can be forwarded either all at one time, or by handshaking portions of email message information therewith until the entire email message information is downloaded to the requester device in the wireless network. Each additional portion downloaded to the destination device would be downloaded in response to a request from the destination device for the messaging server 112 to send another portion of the email message information until the email message information is totally delivered to the destination device in the wireless network.

Additionally, the messaging server 112, according to another example, may comprise a Wireless Application Protocol (WAP) gateway and a WML server. The messaging server 112, according to this example, receives message information from a remote server 122, such as from across the Internet, and, for example, the world wide web, 118, in a manner well known to those of ordinary skill in the art. According to this example, "chunks" of message information are requested by the particular one of the at least one of the wireless messaging communication devices 130, 140. The messaging server 112 services each request by communicating with the remote server 122 and downloading requested message information and storing the message information in the message memory 116. Then, the messaging server 112 forwards portions of the stored message information to the requesting one of the at least one of the wireless messaging communication devices 130, 140, and continues handshaking portions of message information therewith until the entire requested message information is downloaded to the requester device in the wireless network.

Figure 2:
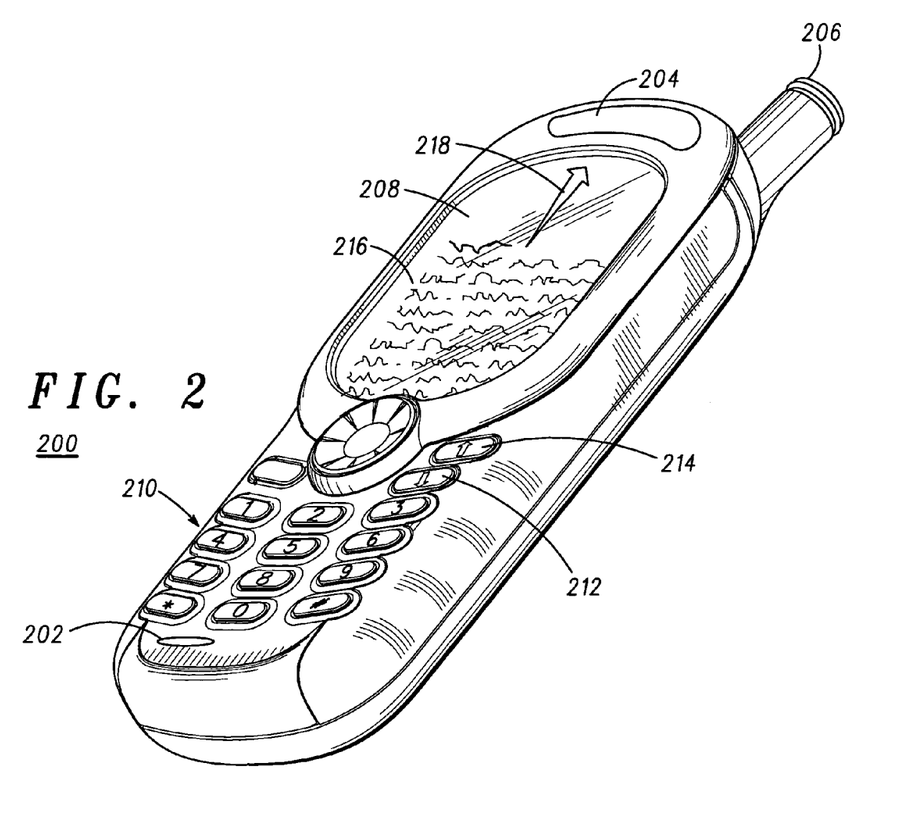
FIG. 2 is a front side view of a portable telephone with messaging capability according to a preferred embodiment of the present invention.

FIG. 2 is a front side view of a portable telephone 200 with messaging capability according to a preferred embodiment of the present invention. The portable telephone 200 shown in FIG. 2 corresponds to the exemplary smart phone 130 shown in FIG. 1. The portable telephone 200 includes an antenna 206 for transmitting and receiving signals in the wireless network shown in FIG. 1. A user interface, for providing user output to a user and for receiving user input from the user, is particularly shown according to the preferred embodiment. The portable telephone 200 includes a microphone 202 and an earpiece speaker 204 for receiving audio from a user and for providing audio to the user, in accordance with a portable telephone operation as is well known to those of ordinary skill in the art. The portable telephone 200 also includes a display screen 208 for displaying information, such as messaging information 216, to the user. The user interface also includes a keypad interface 210 for receiving user input from a user. Further, a down arrow button 212 and an up arrow button 214, according to the present example, provide a means, inter alia, for accepting user selection for scrolling through message information stored in a message memory of the portable telephone 200.

Note that the message information 216, according to this example, is displayed by scrolling lines of the message information 216 in the direction of the arrow 218. The user selects scrolling display function by pressing and then releasing once the down arrow button 212. Normally, the message information 216 will progressively scroll 218 across the display screen 208, line by line, in automatic fashion until the end of the message is reached. The message information scrolls at a first scroll rate that is constant at a relatively slow speed for convenient slow reading of the message information being displayed. If the user wishes to increase the scroll rate, such as for fast reading the displayed message information, then the user presses and holds down for two seconds the down arrow button 212 and then releases the down arrow button 212. This button manipulation sequence will start the message information scrolling at a second scroll rate that is constant at a relatively fast speed for fast reading of the message information being displayed. To return to the slow scroll rate the user presses and then quickly releases once the down arrow button 212. If the user wishes to stop scrolling at any point in the process, the user presses and releases once the up arrow 214 to stop scrolling. To start scrolling again the user presses and releases the up arrow 214 again. In this way, the user conveniently reads the displayed message information being scrolled 218, line by line, across the display screen 208. Of course, there are many different ways that the scrolling function may be implemented by activation from a user interface, as should be obvious to those of ordinary skill in the art in view of the present discussion.

Figure 3:
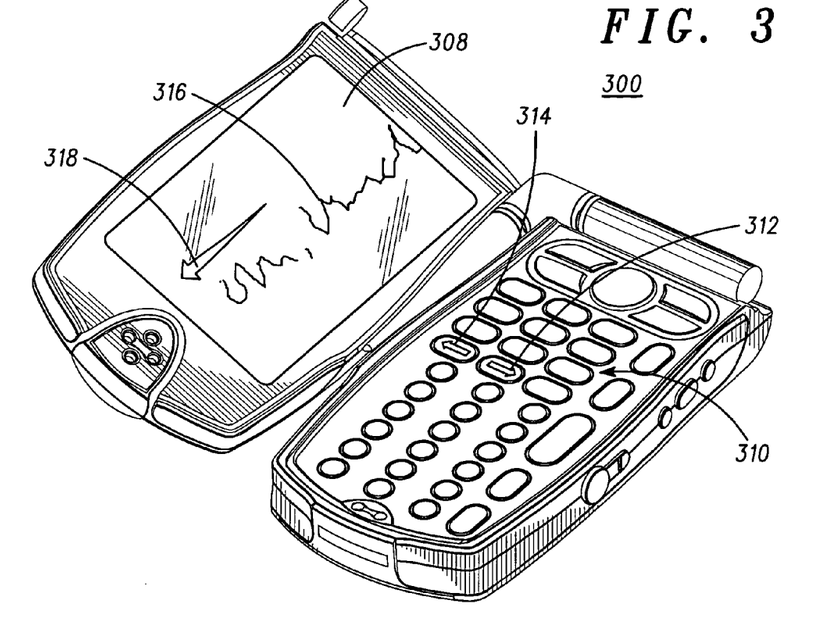
FIG. 3 is a front side view of a wireless communication device with messaging capability according to a preferred embodiment of the present invention.

FIG. 3 is a front side view of a two-way paging and wireless messaging device 200 with messaging capability according to a preferred embodiment of the present invention. The two-way paging and wireless messaging device 300 shown in FIG. 2 corresponds to the exemplary two-way paging and wireless messaging device 140 shown in FIG. 1. The device 300 includes an integral antenna (not shown) for transmitting and receiving signals in the wireless network shown in FIG. 1. A user interface, for providing user output to a user and for receiving user input from the user, is particularly shown according to the preferred embodiment. The two-way paging and wireless messaging device 300 includes a display screen 308 for displaying information, such as messaging information 316, to the user. The user interface also includes a keypad interface 310 for receiving user input from a user. Further, a down arrow button 312 and an up arrow button 314, according to the present example, provide a means, inter alia, for accepting user selection for scrolling through message information stored in a message memory of the wireless messaging device 300.

Note that the message information 316, according to this example, is displayed by scrolling characters of the message information 316 in the direction of the arrow 318. The display screen 308 scrolls message information, character by character, like a marquee display. The user selects scrolling display function by pressing and then releasing once the down arrow button 312. Normally, the message information 316 will progressively scroll 318 across the display screen 308, character by character, in automatic fashion until the end of the message is reached. The message information scrolls at a first scroll rate that is constant at a relatively slow speed for convenient slow reading of the message information being displayed. If the user wishes to increase the scroll rate, such as for fast reading the displayed message information, then the user presses and holds down for two seconds the down arrow button 312 and then releases the down arrow button 312. This button manipulation sequence will start the message information scrolling at a second scroll rate that is constant at a relatively fast speed for fast reading of the message information being displayed. To return to the slow scroll rate the user presses and then quickly releases once the down arrow button 312. If the user wishes to stop scrolling at any point in the process, the user presses and releases once the up arrow 314 to stop scrolling. To start scrolling again the user presses and releases the up arrow 314 again. In this way, the user conveniently reads the displayed message information being scrolled 318, character by character, across the display screen 308.

Figure 4:
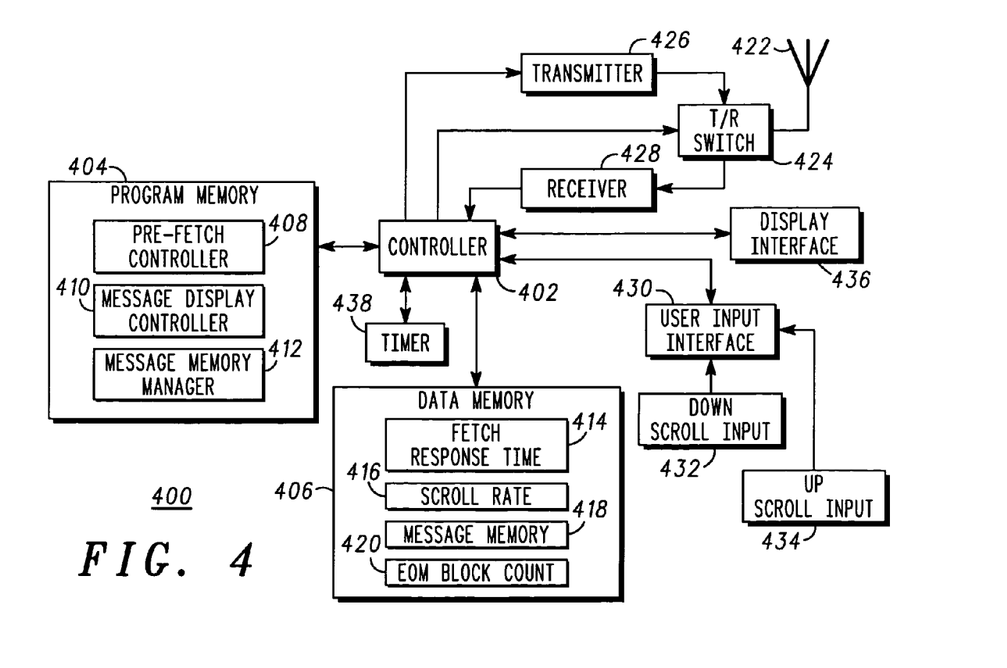
FIG. 4 is a block diagram illustrating an exemplary wireless communication device according to a preferred embodiment of the present invention.

FIG. 4 is a block diagram illustrating an exemplary wireless messaging communication device 400 according to a preferred embodiment of the present invention. The wireless messaging communication device 400 shown in detail in FIG. 4 corresponds, in relevant part, to the wireless messaging communication devices 130, 140, illustrated in FIG. 1. According to one embodiment of the present invention, the wireless messaging device 400 comprises a smart phone 130 such as shown and discussed with reference to FIGS. 1 and 2. Note that the audio interfaces, such as an ear piece speaker and a microphone, the related audio circuits, and the related audio processing functional components, which would normally be found in a smart phone 130, are not shown in FIG. 4. According to an alternative embodiment of the present invention, the wireless messaging device 400 corresponds to a two-way paging and wireless messaging device 140 such as shown and discussed with reference to FIGS. 1 and 3.

The wireless messaging communication device 400 is capable of receiving and transmitting radio frequency signals over a communication channel under a communications protocol such as CDMA, FDMA, CDMA, GPRS, or GSM, UMTS, or a two-way paging and wireless messaging protocol. The wireless messaging communication device 400 operates under the control of a controller 402 which switches the wireless messaging communication device 400 between receive and transmit modes by controlling a transmit/receive switch 314. In receive mode, the controller 402 couples an antenna 422 through a transmit/receive switch 424 to a receiver 428. The receiver 428 decodes the received signals and provides those decoded signals to the controller 402. In transmit mode, the controller 402 couples the antenna 422, through the switch 424, to a transmitter 426.

The controller 402 operates the transmitter and receiver according to instructions stored in program memory 404. Additionally, the controller 402 is communicatively coupled to the data memory 406 for storing and retrieving data necessary for performing the functions of the wireless device 400, as will be discussed below. The stored instructions include a neighbor cell measurement scheduling algorithm. The program memory 404 preferably comprises at least one of Flash memory, battery backed-up random access memory (RAM) or dynamic random access memory (DRAM), and/or other such non-volatile memory. A timer module 438 provides timing information to the controller 402 to keep track of timed events. Further, the controller 402 can utilize the time information from the timer module 438 to keep track of scheduling for neighbor cell server transmissions and transmitted color code information.

When a neighbor cell measurement is scheduled, the receiver 428, under the control of the controller 402, monitors neighbor cell servers and receives a "received signal quality indicator" (RSQI). An RSQI circuit (not shown) generates RSQI signals representing the signal quality of the signals transmitted by each monitored cell server. Each RSQI signal is converted to digital information by an analog-to-digital converter (not shown) and provided as input to the controller 402. Using the color code information and the associated received signal quality indicator, the wireless messaging device 400 determines the most appropriate neighbor cell server to use as a primary cell server when hand-off is necessary.

The controller 402 controls various functions and operations of the wireless device 400, as will be described in greater detail below. In various embodiments of the present invention, the controller 402 can comprise at least one processor for performing various functions, operations, and tasks for the wireless device 400. The program memory 404 provides instructions to the controller 402 for functioning as a pre-fetch controller 408, as a message display controller 410, and as a message memory manager 412. The pre-fetch controller 408 determines when it is time to send a request to the wireless messaging system controller 102 to fetch an additional portion of message information being displayed while scrolling across the display screen 208 of a wireless device 200 (see FIG. 2), or alternatively while scrolling across the display screen 308 of a wireless device 300 (see FIG. 3). According to one of the operations of the pre-fetch controller 408, it operates with the timer module 438, to measure the average fetch response time that the wireless messaging system 100 requires to provide the additional portion of message information following the transmission of the corresponding request by the wireless messaging device 400. This average fetch response time is updated for every fetch request, and the cumulative average response time is stored in the message fetch response time 414 parameter in the data memory 406. The message display controller 410 controls the functions that display message information on the display screen. For example, the message display controller 410 is responsive to the down arrow 212 and the up arrow 214 for controlling the scrolling of message information 216 on the display screen 208 (see FIG. 2). Likewise, the message display controller 410 is responsive to the down arrow 312 and the up arrow 314 for controlling the scrolling of message information 316 on the display screen 308 (see FIG. 3). The particular scroll rate, whether slow scroll rate or fast scroll rate, that is associated with a particular display mode is stored in a scroll rate 416 parameter in the data memory 406. The scroll rate 416 corresponds to an amount of message information that is being scrolled across the display screen relative to time. Lastly, the message memory manager 412 controls the process for handling message information that is stored in the message memory 418, including managing the parameters, such as pointers and message counters including the end of message (EOM) block count 420. The EOM block count 420 keeps track of how much message information remains stored in the message memory 418 and waiting to be displayed on the display screen.

Note that at a particular scroll rate 416 and with an EOM block count 420 that indicates the amount of remaining message information to be displayed, the pre-fetch controller 408 can calculate the approximate amount of time remaining for scrolling display the remaining message information stored in message memory 418. When the calculated amount of time for scrolling display the remaining message information stored in message memory 418 is less than or equal to the average message fetch response time 414, the pre-fetch controller 408 determines that it is time to request another portion of message memory from the wireless messaging server 112. This novel message pre-fetch process is a significant advantage of the present invention, and according to a preferred embodiment of the present invention will be discussed in more detail below.

The wireless messaging device 400 includes a display interface 436 for the controller 402 to couple signals with a display module (not shown) for controlling scrolling display of message information 216, 316, on the display screen 208, 308. As message information is scrolled across the display screen, the message display controller 410 controls the scrolling of message information 216 on the display screen 208 (see FIG. 2), or likewise controls the scrolling of message information 316 on the display screen 308 (see FIG. 3).

The controller 402 is also communicative coupled to a user input interface 430 for capturing user input from a user of the device 400. For example, the controller 402 captures the user input events when the user activates the down scroll button 432 and when the user activates the up scroll button 434. The message display controller 410, in accordance with the captured user input events, controls the scrolling of message information 216, 316, on the display screen 208, 308, (as shown in FIGS. 2 and 3).

Figure 5:
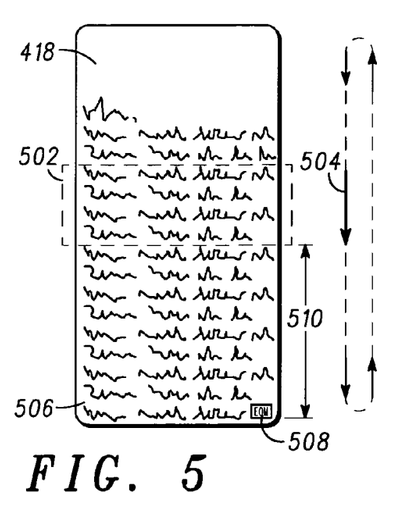
FIGS. 5 and 6 are illustrations showing message scrolling display and message pre-fetch in accordance with a preferred embodiment of the present invention.
Figure 6:
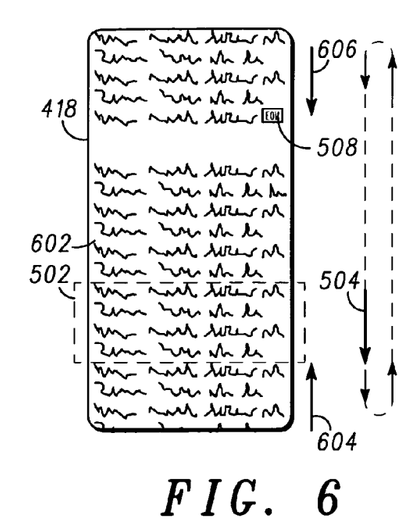

FIGS. 5 and 6 are illustrations showing an exemplary process for message scrolling display and utilizing message pre-fetch, in accordance with a preferred embodiment of the present invention. The exemplary process can best be visualized with reference to FIG. 2. FIG. 5 shows message information 506 that has been stored in message memory 418. The dashed line rectangle 502 represents a display screen 208 (see FIG. 2) being scrolled down 504 (line by line) over the remaining message information 506 to be displayed on the display screen 208. According the present example, the end of message stored in the message memory 418 is marked by an EOM character 508 stored in memory 418. The message memory 418 is organized as a circular queue such that the message information being stored in the memory 418 will wrap around from the bottom to top of memory 418, in a manner well known to those of ordinary skill in the art. Similarly, the scrolling screen display 502 will advance scroll 504 through the message information 506 until the end of message information (marked by the EOM character 508) is reached in the memory 418. Scrolling display is also similarly advanced 504 in a circular fashion across message information stored in the memory 418. The distance 510 of message information from the bottom of the display screen 502 to the end of message information 506, as marked by the EOM character 508, is stored in the EOM Block Count 420 (see FIG. 4) to indicate the amount of stored message information 506 remaining to be displayed.

When the pre-fetch controller 408 determines that at the current scroll rate 416 the amount of stored message information 506 remaining to be displayed (stored in the EOM Block Count 420) will end an automatic scrolling display function at approximately the message fetch response time 414, or less, the pre-fetch controller 408 sends a request to the wireless messaging server 112 to fetch additional message information for the particular message being scroll displayed via the display screen 208.

With reference to FIG. 6, when the requested additional message information 602 is transmitted in the wireless messaging system 100 to the wireless messaging device 400, the additional message information 602 is stored in the message memory 418 according to the circular queue paradigm. The EOM character 508 is also advanced in the memory 419 to indicate the new end of message information 602. The display screen 502 continues to progressively scroll 504 through the stored message information 602 at the scroll rate 416. The amount of stored message information 602 remaining to be displayed (see new distance 604 and 606 to end of message to be displayed) is calculated and stored in the EOM Block Count 420, and progressively updated while the scrolling display 504 advances through the remaining message information 602 to be displayed.

As discussed above, the present invention allows for pre-fetching message information from a wireless messaging server 112 while the wireless communication device continues to automatically scroll display message information stored in message memory. This is a significant advantage of the present invention that is not found in any known prior art system. The automatic scrolling display of message information stored in message memory enhances the user's display reading experience without having to give up the smaller form factor of modern wireless messaging devices, e.g., a cellular phone. Additionally, the automatic pre-fetch of message information from a wireless messaging server allows the user of the wireless messaging devices to enjoy convenient hands-free reading of a large amount of message information that is being automatically scroll displayed to the user of the wireless messaging device. The user also can select the desired scroll rate for reading message information being scroll displayed by the wireless messaging device. These are all novel and valuable features of the preferred embodiments of the present invention.

Figure 7:
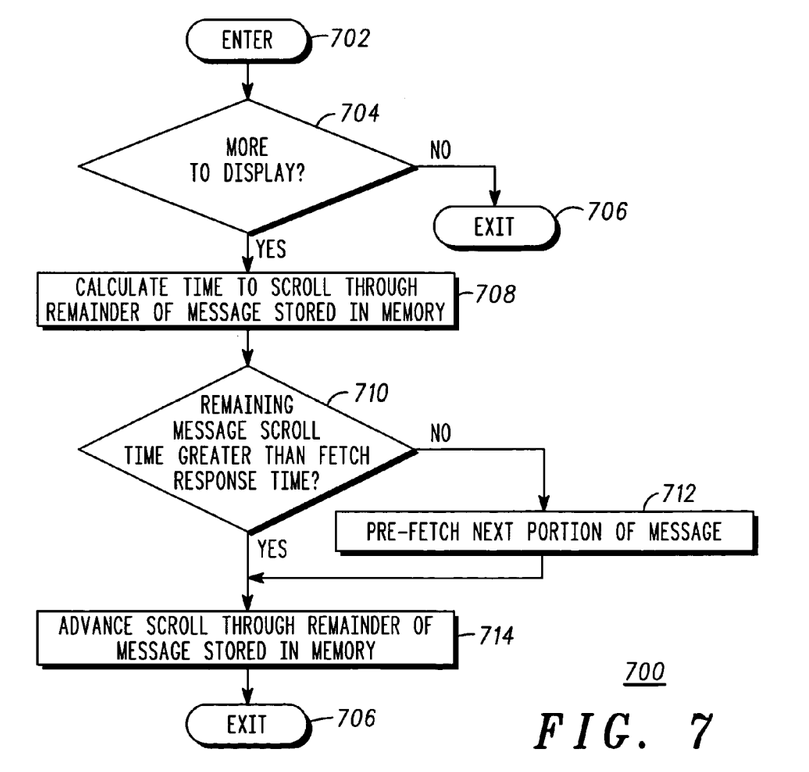
FIG. 7 is an operational flow diagram showing an exemplary operational sequence for message scrolling display and message pre-fetch, according to a preferred embodiment of the present invention.

FIG. 7 is an operational flow diagram showing an exemplary operational sequence 700 for message scrolling display and message pre-fetch, according to a preferred embodiment of the present invention. The controller 402 enters the operational sequence, at step 702, and immediately determines, at step 704, whether there is more message information to be displayed. If not, then the controller 402 exits, at step 706. The controller 402, in the current example, operates according to an interrupt driven real-time architecture where the controller 402 will at a future execution time enter again the operational sequence 700.

Continuing with the operational sequence 700, on the other hand, if there is more message information to be displayed then the pre-fetch controller 408 calculates, at step 708, the time to scroll through the remainder of message information stored in message memory. This calculation has already been specifically discussed above, with reference to FIGS. 4, 5, and 6. Then, at step 710, the pre-fetch controller 408 compares the calculated time to scroll display the remaining message information stored in message memory to the fetch response time 414. Recall the fetch response time 414 is the amount of time expected to take from sending a request to receiving additional message information from a wireless messaging server 112. The fetch response time 414 has been discussed above as a cumulative average time calculated for every request and response with additional message information. This time can be calculated in many different ways, as may be appreciated by those of ordinary skill in the art. For example, the fetch response time 414 can be a pre-defined constant value for a system 100. In this case, the calculation simply uses the pre-defined value stored in the fetch response time 414 parameter in memory 406. Alternatively, the pre-fetch response time 414 can be calculated as the worst case (longest amount of) time detected over messaging communication history of the device 400 sending requests and then receiving responses from the wireless messaging server 112. Other ways of calculating the fetch response time 414 should be obvious to those of ordinary skill in the art in view of the present discussion.

Continuing with the operational sequence, if the remaining time to display the message information is less than or equal to the approximate fetch response time 414, then the pre-fetch controller 408 determines that it is time to send, at step 712, a request for additional message information to a wireless messaging server 112. After the pre-fetch controller 408 determines, at step 710, whether to request additional message information, the message display controller 410 will advance, at step 714, scroll display through the remainder of message information stored in message memory 418, and then the controller 402 exits the operational sequence, at step 706. The interrupt system architecture will at a future time return the controller 402 to enter, at step, 702, the operational sequence. In this way, the novel process automatically scroll displays through the message information stored in message memory while automatically pre-fetching additional message information from the wireless messaging server 112 to maintain the automatic scrolling display of message information until the end of the large message is reached.

Note also that, according to an alternative embodiment of the present invention, while message information is being progressively scroll displayed via a display screen, additional messages may be received by the wireless messaging device 130, 140. These messages could also be automatically scroll displayed, for example, according to a received order or according to another priority. The user, for example, could pre-select an operational mode for the device 130, 140, such as by entering user input via the keypad 210, 310. According to this pre-selected operational mode, the wireless messaging device 130, 140, detects a second received message while automatically scroll displaying a first received message. The device 130, 140, continues to handshake requests for additional message information for the first received message, and accordingly continues to progressively scroll display the message information of the first message via the display screen. When the device 130, 140, however, detects the end of the first message being displayed, the device 130, 140, can immediately switch to scroll displaying the second received message information. In this way, the user can conveniently read a plurality of received messages by automatic scroll display of each message, one after the other, from the device 130, 140.

Additionally, at the end of a scroll display of a message, at the wireless messaging device 130, 140, the device can send an automatic message delete signal to the wireless messaging server 112. This could be sent, for example, with a prompt to user and response to the user input indicating that a delete of message is desired. Alternatively, this could be implemented in many other ways of activating a delete request, as should be obvious to those of ordinary skill in the art in view of the present discussion. For example, a user may enter a user input via a spoken command, via activation of buttons or switches, or other such user input activations. This message delete signal will instruct the wireless messaging server 112 to delete the already read message from the message memory 116 in the wireless messaging server 112. In this way, the message memory 116 is more efficiently managed at the wireless messaging server 112 by deleting already read messages as soon as the user has actually completed reading the messages. This more quickly frees up message memory 116 at the wireless messaging server 112 for increasing the amount of message information that can be processed with the same amount of message memory 116.

The present invention can be realized in hardware, software, or a combination of hardware and software in a wireless messaging device 130, 140, such as shown in FIG. 1. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product which comprises all the features enabling the implementation of the methods described herein, and which, when loaded in a computer system, e.g., in a wireless messaging device 130, 140, is able to carry out these novel methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer-readable medium, allowing a computer system, to read data, instructions, messages or message packets, and other computer-readable information from the computer-readable medium. The computer-readable medium may include non-volatile memory, such as ROM, Flash memory, Disk drive memory, CD-ROM, and other permanent storage. Additionally, a computer-readable medium may include, for example, volatile storage such as RAM, buffers, cache memory, and network circuits. Furthermore, the computer-readable medium may comprise computer-readable information in a transitory state medium such as a network link and/or a network interface, including a wired network or a wireless network, that allow a computer system to read such computer-readable information.

FIG. 4 illustrates a block diagram of a computer system useful for implementing an embodiment of the present invention. The computer system of FIG. 4 comprises a wireless messaging device 400. The computer system of FIG. 4 includes one or more processors, such as processor 402. The processor 402 is connected to a communication device architecture 400. Various software embodiments have been discussed above in terms of this exemplary computer system. After the present discussion, it will be apparent to a person of ordinary skill in the relevant art(s) how to implement embodiments of the present invention using other computer systems and/or computer architectures.

The computer system can include a display interface that displays graphics, text, and other data from the wireless communication server 112 for display on a display screen of a wireless messaging device 130, 140. The computer system includes a main memory, preferably random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a manner well known to those having ordinary skill in the art. Removable storage unit, represents a floppy disk, magnetic tape, optical disk, etc., which is read by and written to by removable storage drive. As will be appreciated, the removable storage unit includes a computer usable storage medium having stored therein computer software and/or data.

In alternative embodiments, the secondary memory may include other similar means for allowing computer programs or other instructions to be loaded into the computer system. Such means may include, for example, a removable storage unit and an interface. Examples of such may include a program cartridge and cartridge interface (such as that found in video game devices), a removable memory chip (such as an EPROM, or PROM) and associated socket, and other removable storage units and interfaces that allow software and data to be transferred from the removable storage unit to the computer system.

The computer system may also include a communications interface. Communications interface allows software and data to be transferred between the computer system and external devices. Examples of communications interface may include a modem, a network interface (such as an Ethernet card), a communications port, a PCMCIA slot and card, etc. Software and data transferred via communications interface are in the form of signals which may be, for example, electronic, electromagnetic, optical, or other signals capable of being received by communications interface. These signals are provided to communications interface via a communications channel. This channel carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory and secondary memory, removable storage drive, a hard disk installed in hard disk drive, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may comprise computer-readable information in a transitory state medium such as a network link and/or a network interface, including a wired network or a wireless network, that allow a computer to read such computer-readable information.

Computer programs (also called computer control logic and computer instructions) are stored in main memory and/or secondary memory. Computer programs may also be received via communications interface. Such computer programs, when executed, enable the computer system to perform the features of the present invention as discussed above. In particular, the computer programs, when executed, enable the processor 402 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. It is intended that the appended claims cover any and all such applications, modifications, and embodiments within the scope of the present invention.

What is claimed is:

1. A method comprising:
    wirelessly receiving message information;
    storing the received message information;
    scroll displaying the stored message information;
    wirelessly requesting fetch of additional message information such that the additional message information will be wirelessly received prior to reaching the end of scroll displaying the stored message information, performed by;
    determining a scroll display time period for scroll displaying the stored message information remaining to be displayed;
    determining a fetch response time period for wirelessly receiving additional message information in response to wirelessly requesting fetch of the of additional message information; and
    wirelessly requesting fetch of additional message information when the scroll display time period is approximately less than or equal to the fetch response time period.

2. The method of claim 1, wherein the wirelessly received message information comprises at least one of text and graphics.

3. The method of claim 1, wherein the stored message information and the additional message information comprise message information corresponding to a message.

4. The method of claim 1, wherein the stored message information comprises message information corresponding to a first message and the additional message information comprises message information corresponding to a second message.

5. The method of claim 1, wherein the scroll displaying of the stored message information is selectively activated by a user of a wireless messaging device.

6. The method of claim 1, wherein the selective activation by a user of the wireless messaging device comprises the user pressing at least one button of the wireless messaging device.

7. The method of claim 1, wherein the scroll displaying of the stored message information is scroll displayed to a user of a wireless messaging device.

8. The method of claim 7, wherein the wireless messaging device comprises a cellular telephone.

9. The method of claim 1, further comprising:
    automatically wirelessly requesting delete of message information at a wireless messaging server in response to receiving a user input to indicate a request to delete the message information.

10. A wireless messaging device comprising:
    a receiver for receiving message information wirelessly transmitted from a wireless communication system;
    a transmitter for wirelessly transmitting information to the wireless communication system;
    a display for progressively displaying message information to a user;

a memory for storing message information;

a device controller, communicatively coupled to the receiver, the transmitter, the display, and the memory, for receiving message information, storing the received message information in the memory, and progressively displaying the stored message information to the user; and a message information fetch controller, communicatively coupled to the device controller, for automatically determining that additional message information is needed to be stored in the memory to continue to progressively displaying message information to the user, by:

determining a progressively display time period for progressively displaying the stored message information remaining to be displayed;

determining a fetch response time period for wirelessly receiving additional message information in response to wirelessly requesting fetch of the of additional message information; and for transmitting a request to the wireless communication system for requesting additional message information be wirelessly transmitted from the wireless communication system to the wireless messaging device to continue to progressively display message information to the user when the progressively display time period is approximately less than or equal to the fetch response time period.

11. The wireless messaging device of claim 10, further comprising user input means, communicatively coupled to the device controller, for progressively displaying the stored message information to the user in response to the user providing user input.

12. The wireless messaging device of claim 10, further comprising user input means, communicatively coupled to the device controller, for automatically progressively displaying the stored message information to the user at a first display rate in response to the user providing a first user activation input, and at a second display rate in response to the user providing a second user activation input.

13. The wireless messaging device of claim 10, wherein the message information comprises at least one of text and graphics.

14. The wireless messaging device of claim 10, further comprising user input means, communicatively coupled to the device controller, for automatically progressively displaying the stored message information to the user in response to the user providing a user activation input.

15. The wireless messaging device of claim 14, wherein the automatically progressively displayed message information comprises message information from a first message and from a second message.

16. A computer readable medium comprising computer instructions for a wireless messaging device for:

wirelessly receiving message information;

storing the received message information;

progressively displaying the stored message information;

wirelessly requesting fetch of additional message information such that the additional message information will be wirelessly received prior to reaching the end of progressively displaying the stored message information, performed by:

determining a progressively display time period for progressively displaying the stored message information remaining to be displayed;

determining a fetch response time period for wirelessly receiving additional message information in response to wirelessly requesting fetch of the of additional message information; and wirelessly requesting fetch of additional message information when the progressively display time period is approximately less than or equal to the fetch response time period.

17. The computer readable medium of claim 16, wherein the wirelessly received message information comprises at least one of text and graphics.

18. The computer readable medium of claim 16, wherein the stored message information comprises message information corresponding to a first message and the additional message information comprises message information corresponding to a second message.

* * * * *